United States Patent
Mochizuki et al.

(10) Patent No.: US 7,365,875 B2
(45) Date of Patent: Apr. 29, 2008

(54) IMAGE PROCESSING APPARATUS, IMAGE PROCESSING METHOD, PROGRAM, AND RECORDING MEDIUM

(75) Inventors: Yasushi Mochizuki, Kanagawa (JP); Takayuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/430,220

(22) Filed: May 7, 2003

(65) Prior Publication Data

US 2003/0214662 A1 Nov. 20, 2003

(30) Foreign Application Priority Data

May 14, 2002 (JP) ............................. 2002-139022
May 14, 2002 (JP) ............................. 2002-139023

(51) Int. Cl.
*N04N 1/40* (2006.01)
(52) U.S. Cl. ......................................... 358/1.9; 358/2.1
(58) Field of Classification Search ................ 358/1.9, 358/2.1; 345/419–422; 382/154
See application file for complete search history.

(56) References Cited

U.S. PATENT DOCUMENTS

| | | | | |
|---|---|---|---|---|
| 4,821,213 A | * | 4/1989 | Cline et al. .................. | 345/424 |
| 6,320,978 B1 | * | 11/2001 | Szeliski et al. ............. | 382/154 |
| 6,809,745 B1 | * | 10/2004 | O'Donnell et al. ......... | 345/634 |
| 7,009,606 B2 | * | 3/2006 | Hiraga et al. ............... | 345/421 |

FOREIGN PATENT DOCUMENTS

| | | |
|---|---|---|
| JP | 7-220115 | 8/1995 |
| JP | 08227464 A | * 9/1996 |

\* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

It enables a user to confirm an already designated area without changing layers. Image data of plural layers is generated on a same image, and an image area being a target of editing is designated on the image data of each layer. Then, if the image area of one layer is designated, a CRT controller causes a CRT to display the image area of each layer designated before the image area of the one layer is designated, in a predetermined display method different from a display method for the designated image area of the one layer.

7 Claims, 17 Drawing Sheets

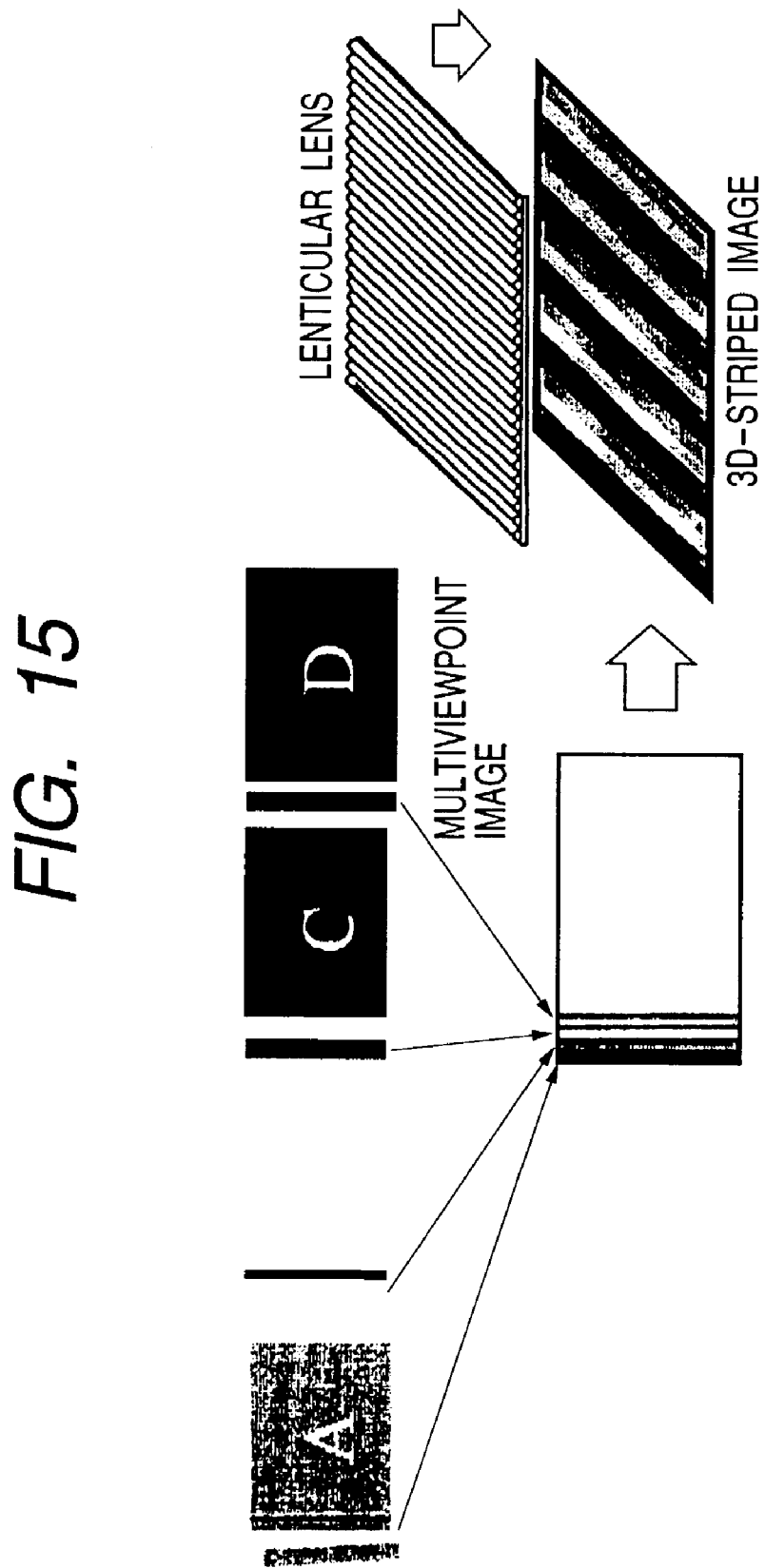

FIG. 16

CUSTOM SETTING

| | 1 . . . . . . . 2 . . . . . 4 . . . 10 ∞ | |
|---|---|---|
| LAYER 1 | ◀|T|━━━━━━━━━━━━━━━━━━▶ | 1.00 |
| LAYER 2 | ◀━━━━━━━|T|━━━━━━━━━▶ | 1.96 |
| LAYER 3 | ◀━━━━━━━━━━━━━━━━━━━▶ | |
| LAYER 4 | ◀━━━━━━━━━━━━━━━━━━━▶ | |
| LAYER 5 | ◀━━━━━━━━━━━━━━━━━━━▶ | |
| LAYER 6 | ◀━━━━━━━━━━━━━━━━━━━▶ | |
| LAYER 7 | ◀━━━━━━━━━━━━━━━━━━━▶ | |
| LAYER 8 | ◀━━━━━━━━━━━━━━━━━━━▶ | |
| LAYER 9 | ◀━━━━━━━━━━━━━━━━━━━▶ | |
| BACKGROUND | ◀━━━━━━━━━━━━━━━|T|▶ | ∞ |

[ OK ] [ CANCEL ] [ RETURN TO DEFAULT (E) ] [ HELP (H) ]

⬇

CUSTOM SETTING

| | 1 . . . . . . . 2 . . . . . 4 . . . 10 ∞ | |
|---|---|---|
| LAYER 1 | ◀|T|━━━━━━━━━━━━━━━━━━▶ | 1.00 |
| LAYER 2 | ◀━━━|T|━━━━━━━━━━━━━━▶ | 1.31 |
| LAYER 3 | ◀━━━━━━━━━|T|━━━━━━━━▶ | 1.96 |
| LAYER 4 | ◀━━━━━━━━━━━━━━━━━━━▶ | |
| LAYER 5 | ◀━━━━━━━━━━━━━━━━━━━▶ | |
| LAYER 6 | ◀━━━━━━━━━━━━━━━━━━━▶ | |
| LAYER 7 | ◀━━━━━━━━━━━━━━━━━━━▶ | |
| LAYER 8 | ◀━━━━━━━━━━━━━━━━━━━▶ | |
| LAYER 9 | ◀━━━━━━━━━━━━━━━━━━━▶ | |
| BACKGROUND | ◀━━━━━━━━━━━━━━━|T|▶ | ∞ |

[ OK ] [ CANCEL ] [ RETURN TO DEFAULT (E) ] [ HELP (H) ]

IMAGE PROCESSING APPARATUS, IMAGE PROCESSING METHOD, PROGRAM, AND RECORDING MEDIUM

BACKGROUND OF THE INVENTION

1. Field of the Invention

The present invention relates to an image processing apparatus, an image processing method which is adopted by the image processing apparatus, a program which is used to execute the image processing method, and a recording medium which records and stores thereon the program.

2. Related Background Art

Conventionally, for the purpose of generating a three-dimensional (or stereoscopic) image from one image data, plural layers are defined in regard to the image data. Then, in a case where the plural layers are edited respectively in different windows on the same screen, since a space where these different windows are provided is limited, the size of each window must be set to small. For this reason, as shown in FIG. 6, only a layer change means is provided so that the different layers of the image data are changeably displayed and edited in the same window.

FIG. 6 shows that a layer 1 and a layer 2 are defined, the layer 1 selected at present is displayed together with an icon disposed on its right, the layer 1 is displayed in the most foreground (this side), and the layer 2 is displayed behind the layer 1. Besides, on the screen shown in FIG. 6, the area which should be included in the layer 1 is designated by drawing the closed area. Moreover, FIG. 7 shows that the layer 2 is selected. Here, as well as the layer 1 shown in FIG. 6, the area which should be included in the layer 2 can be designated by surrounding it with the closed area, as shown in FIG. 7.

That is, information which concerns the area designation in each layer is an important factor to generate the definitive three-dimensional image. However, it becomes difficult to easily discriminate the areas designated in each area as the number of layers capable of being set increases. Therefore, in such a case, it is necessary to confirm the areas in the various layers by frequently using the layer change means.

On one hand, conventionally, a method of causing each layer to have a certain distance (i.e., a margin for separating the layer in question from other layer) does not exist, whereby also a method of generating the image data so that a variable distance is given between the layers does not exist. Therefore, for the purpose of generating the three-dimensional image data, it is necessary to generate the image data as carefully considering perspective between objects, as well as a case where plural objects are all formed on a single layer.

Moreover, conventionally, a method of determining, in a case where a layer is added, the distance between the previous layer and the added layer does not exist, and also a method of determining, in a case where one layer is deleted, the distance between the layers other than the deleted layer does not exist.

SUMMARY OF THE INVENTION

The present invention has been completed in consideration of the problems as above, and an object thereof is to provide an image processing apparatus which enables a user to confirm an already designated area without changing layers, an image processing method which is adopted by the above image processing apparatus, a program which is used to execute the above image processing method, and a recording medium which records and stores thereon the above program.

Another object of the present invention is to provide an image processing apparatus which enables, e.g., at the end of an editing process, a user to confirm at one view image areas which have been edited so far, an image processing method which is adopted by the above image processing apparatus, a program which is used to execute the above image processing method, and a recording medium which records and stores thereon the above program.

Still another object of the present invention is to provide an image processing apparatus which can easily change a distance between layers in image data composed of plural layers, an image editing method which is adopted by the above image processing apparatus, a program which is used to execute the above image editing method, and a storage medium which stores therein the above program.

Still another object of the present invention is to provide an image processing apparatus which can easily determine a distance between layers in a case where the layer is added and/or deleted in image data composed of plural layers, an image editing method which is adopted by the above image processing apparatus, a program which is used to execute the above image editing method, and a storage medium which stores therein the above program.

In order to achieve the above objects, an image processing apparatus according to a first aspect of the present invention is characterized by comprising: an image data generation means for generating image data of plural layers on a same image; an image area designation means for designating an image area being a target of editing on the image data of each layer; and a display control means for causing, if the image area of one layer is designated by the image area designation means, a display means to display the image area of each layer designated before the image area of the one layer is designated, in a predetermined display method different from a display method for the designated image area of the one layer.

An image processing method according to a second aspect of the present invention is characterized by comprising: a step of causing an image data generation means to generate image data of plural layers on a same image; a step of causing an image area designation means to designate an image area being a target of editing on the image data of each layer; and a step of causing, if the image area of one layer is designated by the image area designation means, a display means to display the image area of each layer designated before the image area of the one layer is designated, in a predetermined display method different from a display method for the designated image area of the one layer.

A program according to a third aspect of the present invention is characterized by causing a computer to execute the above image processing method.

A recording medium according to a fourth aspect of the present invention is characterized by recording thereon the above program.

An image processing apparatus according to a fifth aspect of the present invention is characterized by comprising: an object setting means for setting, on image data composed of plural layers, object information being a target of editing with respect to each layer; a distance setting means for setting distance information representing a distance between the layers; and a generation means for generating three-dimensional image data from the image data on the basis of the distance information set by the distance setting means and the object information set by the object setting means.

An image processing method according to a sixth aspect of the present invention is characterized by comprising: a step of causing an object setting means to set, on image data composed of plural layers, object information being a target of editing with respect to each layer; a step of causing a distance setting means to set distance information representing a distance between the layers; and a step of causing a generation means to generate three-dimensional image data from the image data on the basis of the distance information set by the distance setting means and the object information set by the object setting means.

A program according to a seventh aspect of the present invention is characterized by causing a computer to execute the above image processing method.

A recording medium according to an eighth aspect of the present invention is characterized by recording thereon the above program.

Further functions and characteristics of the present invention will become apparent from the following embodiments and the attached drawings.

BRIEF DESCRIPTION OF THE DRAWINGS

FIG. 15 is a view for explaining a method of generating a three-dimensional striped image by using a lenticular lens, according to the second embodiment of the present invention;

FIG. 16 is a view showing the distance between the layers in a case where the layer is added, according to the second embodiment of the present invention;

FIG. 17 is a view is a view showing the distance between the layers in a case where the layer is deleted, according to the second embodiment of the present invention.

DETAILED DESCRIPTION OF THE PREFERRED EMBODIMENTS

Hereinafter, the embodiments of the present invention will be explained in detail with reference to the attached drawings.

First Embodiment

Figure 1:
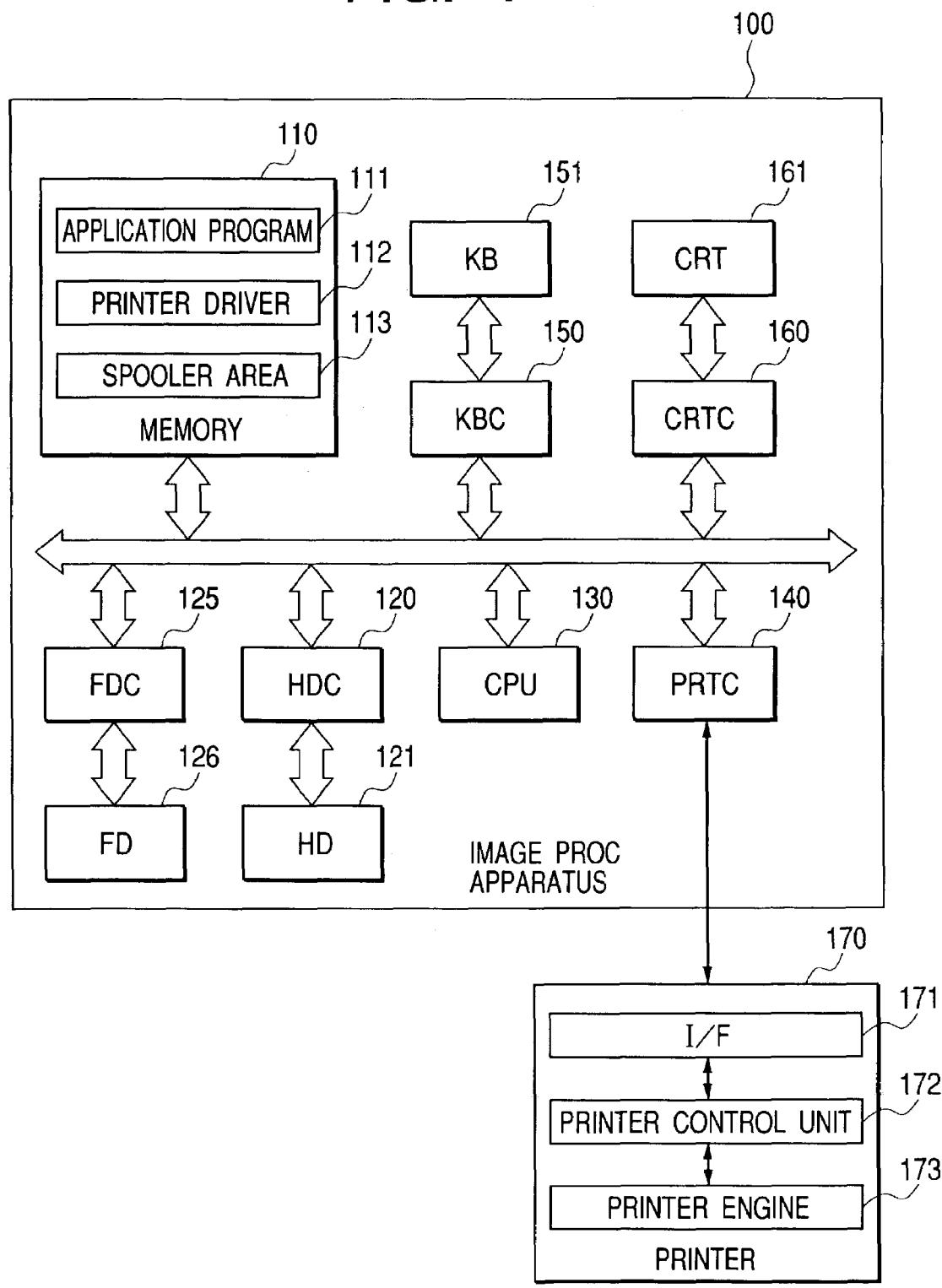
FIG. 1 is a block diagram showing a structural example of an image forming system to which an image processing apparatus according to one (first) embodiment of the present invention is applicable.

FIG. 1 is a block diagram showing a structural example of an image forming system to which an image processing apparatus according to the first embodiment of the present invention is applicable.

As shown in FIG. 1, the image forming system according to the present embodiment consists of an image processing apparatus 100 which generates print data (including a control command, hereinafter), and a printer 170 which forms an image on the basis of the print data generated by the image processing apparatus 100.

Moreover, the image processing apparatus 100 consists of a memory 110, a CPU 130, a hard disk controller (HDC) 120, a hard disk (HD) 121, a floppy™ disk controller (FDC) 125, a floppy™ disk drive (FD) 126, a printer controller (PRTC) 140, a keyboard controller (KBC) 150, a keyboard (KB) 151, a CRT controller (CRTC) 160, and a CRT 161.

The memory 110 includes, e.g., an application program 111 which has been loaded from the HD 121 to control the image editing process according to the present invention, a printer driver 112 which is the software used to generate print data corresponding to the printer 170, a spooler area 113 which spools the print data to be supplied to the printer 170, a not-shown operating system (OS), a not-showing working area, and the like.

The CPU 130 operates on the basis of the application program 111, the printer driver 112, the OS and the like which have been stored in the memory 110. The CPU 130 is booted up by a not-shown ROM when power is applied. Subsequently, the CPU 130 loads the OS from the HD 121 to the memory 110 and thereafter loads the application program likewise, whereby the image forming system is activated as a whole. In addition, of course, the CPU 130 can access the HD 121 through the HDC 120.

The PRTC 140 performs a process to sequentially transmit the print data stored in the spooler area 113 to the printer 170, and the KBC 150 controls the KB 151 to capture instruction data from a user into the image processing apparatus 100. The CRTC 160 is the controller which controls the CRT 161 acting as a display apparatus. Although the block which consists of the KBC 150, the KB 151, the CRTC 160 and the CRT 161 acts as a user interface, it is possible to further provide other user-interface block which consists of, e.g., a pointing device and the like.

Moreover, the printer 170 consists of an interface (I/F) 171 which receives the print data transferred from the image processing apparatus 100 and meanwhile notifies the image processing apparatus 100 of various statuses, a printer control unit 172 which mainly analyzes the received print data and then generates bitmap image data on the basis of the analyzed result, and a printer engine 173 which receives the bitmap image data transferred from the printer control unit 172 and then actually forms the image on the basis of the received bitmap image data. Here, it should be noted that the printer 170 also includes an operation panel and the like, though there are not shown.

In such a structure as above, in a case where the printer 170 is connected to the image processing apparatus 100, it is necessary in the first stage to install in the image processing apparatus 100 the printer driver which is used to generate the print data corresponding to the printer 170. Incidentally, it is needless to say that such installation typically suffices if it is performed once, as long as there is no particular reason.

Figure 2:
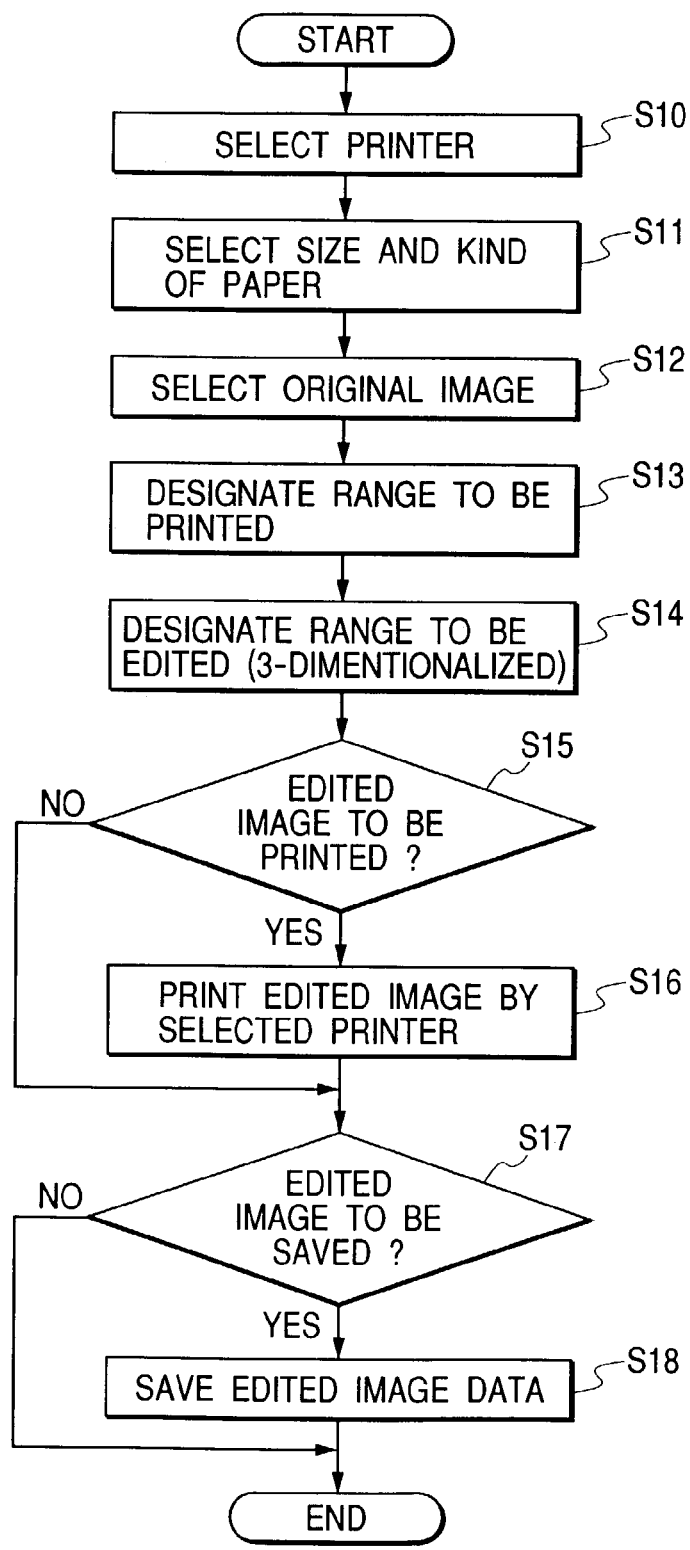
FIG. 2 is a flow chart showing an example of a first control processing procedure in the image processing apparatus according to the first embodiment of the present invention.

FIG. 2 is a flow chart showing an example of a first control processing procedure in the image processing apparatus according to the first embodiment of the present invention. Here, it should be noted that the first control processing procedure corresponds to a processing procedure which is executed based on an image editing program for editing three-dimensional image data adapted to a specific print apparatus, and it is assumed that the first control processing procedure shown in the flow chart of FIG. 2 is executed by the CPU 130 of FIG. 1 on the basis of the program stored in the HD 121 and loaded to the memory 110. Incidentally, symbols S10 to S18 in FIG. 2 respectively denote steps to be executed in the first control processing procedure. Besides, it is assumed that the three-dimensional image data is the image data which has been processed so that the image printed based on the processed image data can be three-dimensionally viewed by an observer through the lenticular lens. Hereinafter, the first control processing procedure in the image processing apparatus according to the present embodiment will be explained with reference to the flow chart of FIG. 2.

First, after the image editing program was activated, the printer which should be used to print the image data is selected in the step S10. In regard to the three-dimensional image data, it is necessary to generate the data which is conformable with the pitch of the cross stripes of the lenticular lens, whereby the resolution of the used print apparatus is important. That is, all the printers which can be selected in the step S10 are the printers of the same basic resolution.

Next, in the step S11, the size and kind of paper on which the image data is printed are selected. Then, according to the image editing program, the image which is conformable with the selected paper size is generated, and the selected paper kind is notified to the printer driver of the selected printer in the later-described step S16. As a result, the optimum print data for the selected paper kind is transmitted to the selected printer.

Next, in the step S12, original image data is selected. Then, in the step S13, the range (i.e., trimming area) which should be printed is designated in the selected image data. Here, it should be noted that the trimming area is the rectangular area which is in conformable with the selected paper size. Then, according to the image editing program, the image corresponding to the image data and the rectangular area conformable with the paper size are first displayed on the CRT 161. The user whereby selects, as an image data printing range, the range which is surrounded by the rectangular area conformable with the paper size in the image corresponding to the image data displayed on the CRT 161.

Next, in the step S14, the area which should be three-dimensionalized is designated from the image data in each layer. Here, how to add and delete the layer and an editing procedure for each layer will be explained in detail with reference to later-described FIG. 3. Next, in the step S15, it is judged whether or not to print the edited image. If it is judged to print the edited image (i.e., if the user instructs to print the edited print data), then, in the step S16, the designated trimming area is subjected to the trimming in conformity with the selected printer (its resolution and the like), the selected paper size and the selected paper kind, and the three-dimensional data is generated by synthesizing all the areas of each layer designated in the step S14, whereby the optimum print data (image data) for the selected printer, paper size and paper kind is transmitted to the selected printer, and the flow then advances to the step S17. Here, it is assumed that the selected paper size and the selected paper kind are notified to the printer driver of the selected printer when the image data is actually printed (i.e., when the image data is transmitted). On the other hand, if it is judged in the step S15 not to print the edited image (i.e., if the user does not wish to instruct to print the edited print data), the flow directly advances to the step S17.

Next, it is judged in the step S17 whether or not to save or store the edited image. If it is judged to save the edited image, then the flow advances to the step S18 to save the edited image data in the HD 121, FD 126 and the like shown in FIG. 1. At the time (i.e., when the edited image data is saved), the data to be saved includes a name of selected printer, a name of original image data, three-dimensional designation information and the like, that is, the image data itself after it was edited is not saved in a file, whereby the size of that file itself is considerably small. On the other hand, if it is judged in the step S17 not to save the edited image, then the process ends as it is.

Figure 3:
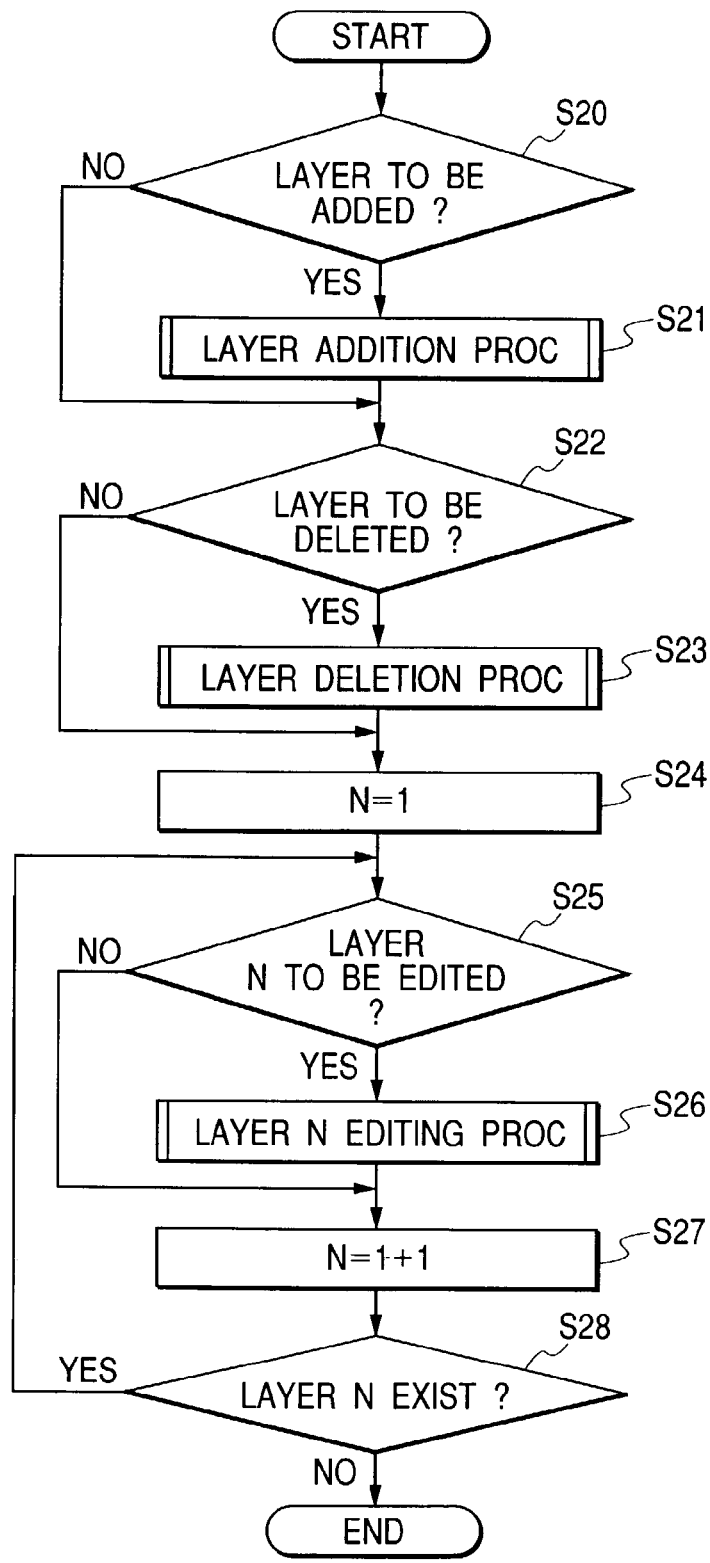
FIG. 3 is a flow chart showing addition and deletion of each layer and an editing processing procedure of each layer.

FIG. 3 is a flow chart showing the addition and deletion of each layer and the editing processing procedure of each layer in the step S14 of FIG. 2. Here, it is assumed that the process shown in the flow chart of FIG. 3 is executed by the CPU 130 of FIG. 1 on the basis of the program stored in the HD 121 and loaded to the memory 110. Incidentally, symbols S20 to S28 in FIG. 3 respectively denote steps to be executed in the addition and deletion of each layer and the editing processing procedure of each layer in the step S14 of FIG. 2. Hereinafter, the editing processing procedure of each layer will be explained with reference to the flow chart of FIG. 3.

First, in the step S20, it is judged by the user whether or not to add the layer so as to make the image data further multilayered. If it is judged by the user to add the layer, the flow advances to the step S21 to perform a layer addition process and then generate the image data subjected to the layer addition process. Next, contrary to the step S20, it is judged by the user in the step S22 whether or not to delete the layer. If it is judged by the user to delete the layer, the flow advances to the step S23 to perform a layer deletion process and then generate the image data subjected to the layer deletion process. Next, in the step S24, a numeric value "1" is substituted for a variable N in the program.

Subsequently, in the step S25, it is judged by the user whether or not to edit the layer N (i.e., layer 1 if N=1). If it is judged to edit the layer N, the flow advances to the step S26 to designate the area to be three-dimensionalized in each layer (layer N in this case). On this occasion, according to the image editing program, one or plural areas are designated as the area to be three-dimensionalized corresponding to the layer N, and the area to be three-dimensionalized of the layer N is displayed as a closed area on the image corresponding to the image data on the CRT 161. By using the displayed contents, the user selects the range surrounded by the closed area from the image corresponding to the image data displayed on the CRT 161, as the range to be three-dimensionalized.

Figure 4:
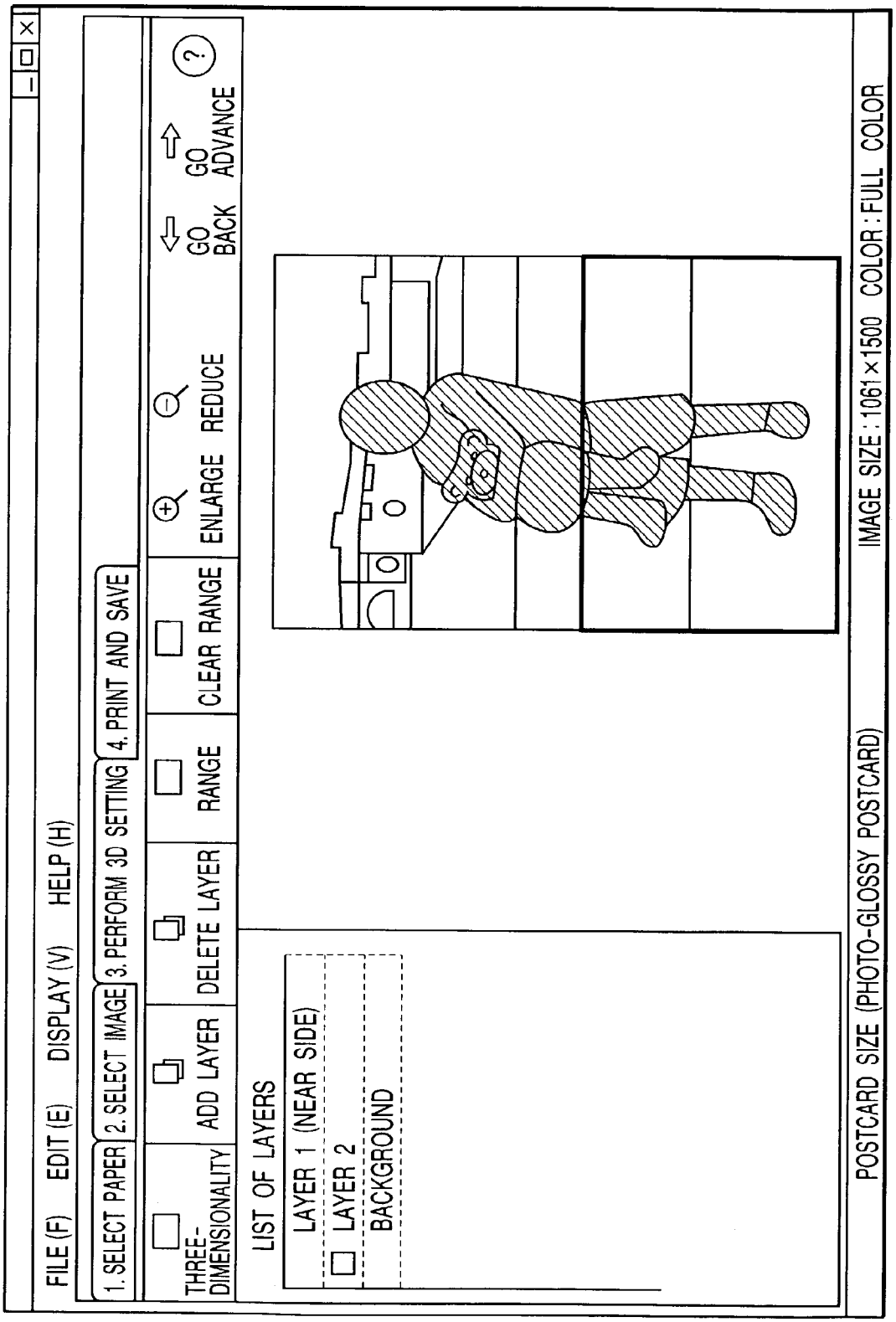
FIG. 4 is a view showing a displaying example of a screen in a case where the area of a layer 2 according to the first embodiment of the present invention is designated.

Then, the closed area selected here as the range to be three-dimensionalized is displayed with shading (or halftone-dot meshing) when the editing process to a layer N+1 and following layers is next performed. Thus, all the image areas of the already-edited layers are displayed with shading as OR-processed (logical-summed) areas, whereby it is possible to cause the user to be able to know at one view the already-designated image areas. For example, as shown in FIG. 4, in the state that the layer 2 is selected, the areas designated on the foreground (this-side) layer are all OR-processed and displayed with shading on the same window, whereby the user can confirm or find the area designated on another layer even if the layer is not changed. Here, it should be noted that the foreground layer indicates the layer 1 in a case where the layer 2 is selected, and indicates the layer 1 and the layer 2 in a case where the layer 3 is selected.

Figure 5:
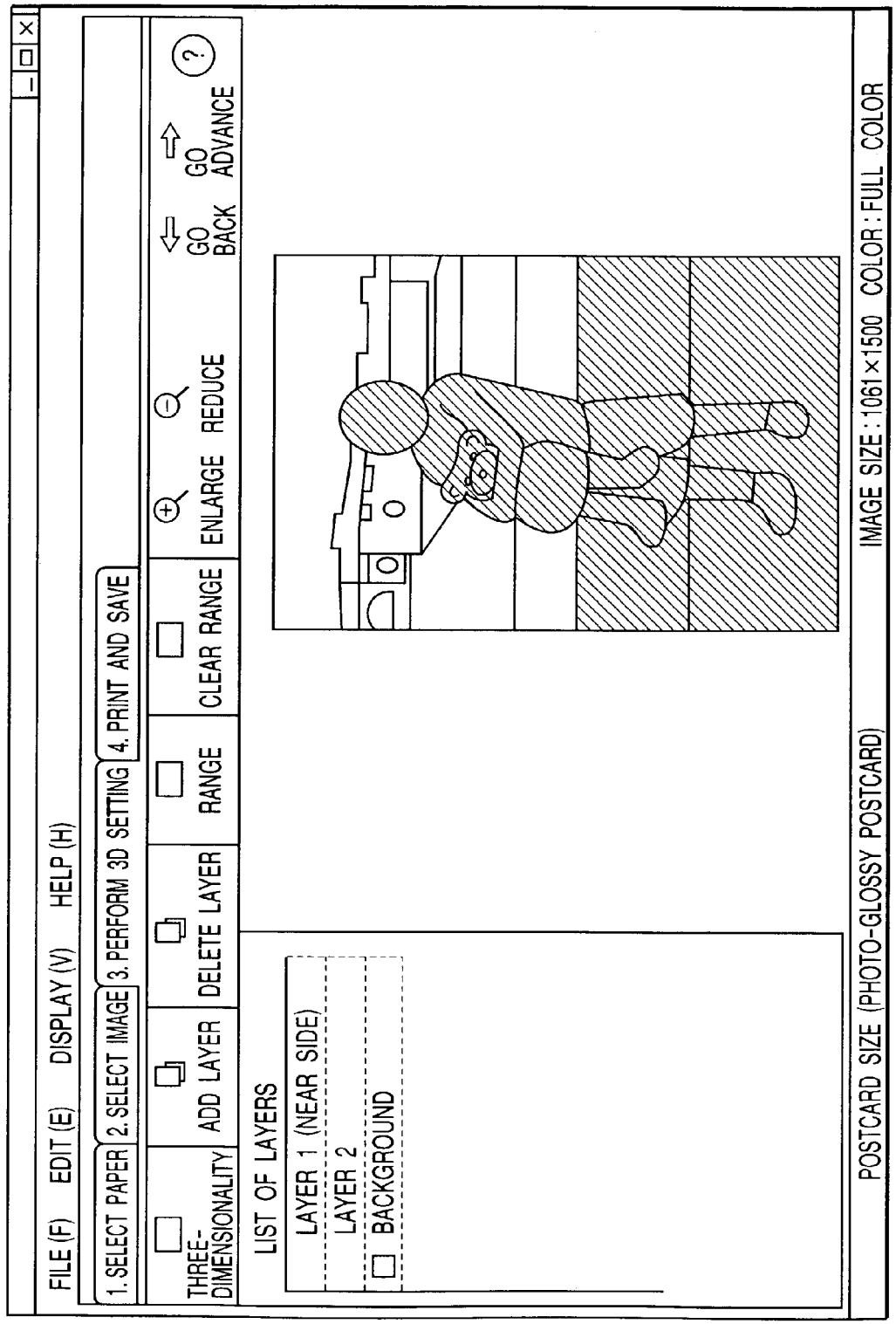
FIG. 5 is a view showing a displaying example of the screen in a case where the area of a background layer according to the first embodiment of the present invention is designated.
Figure 6:
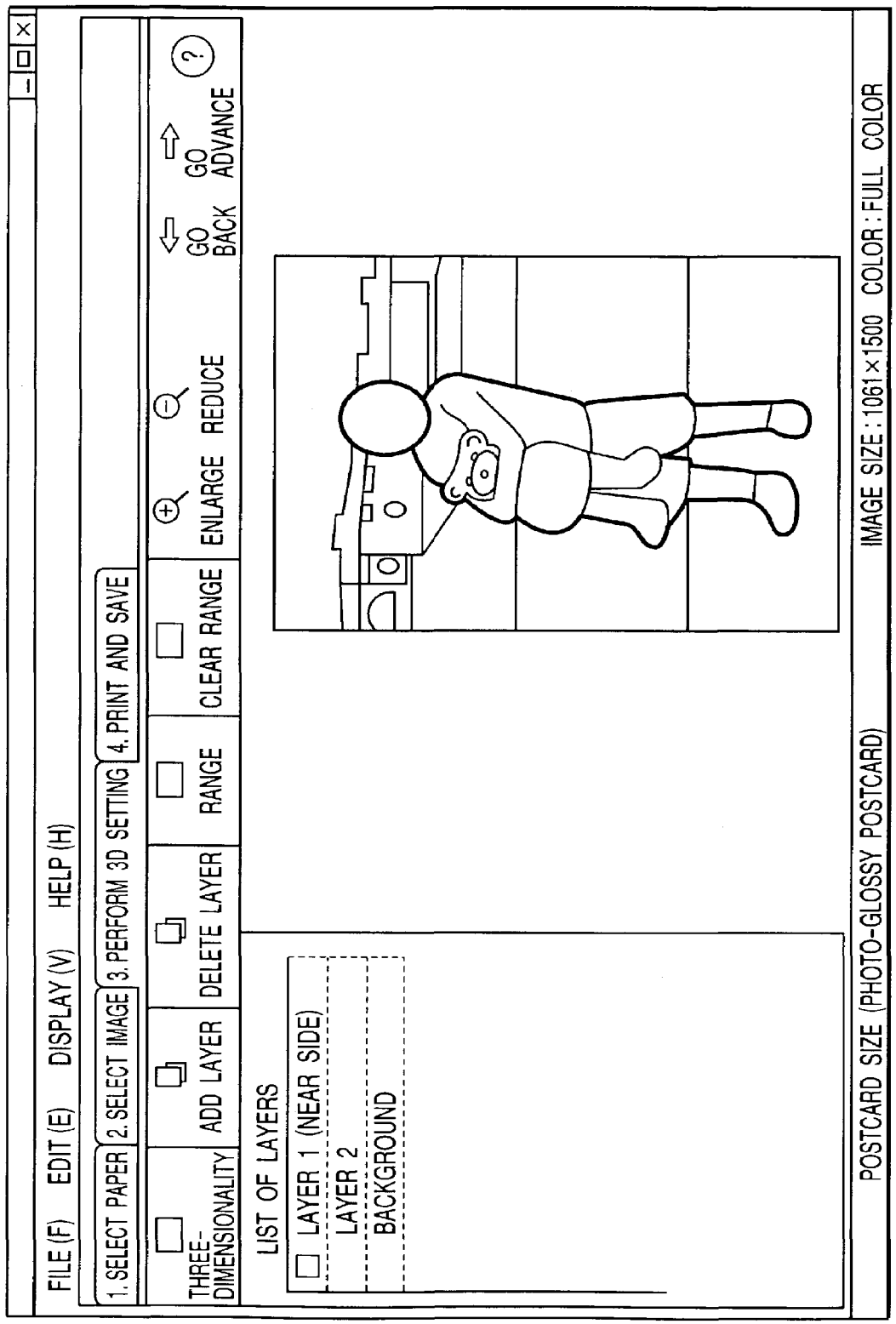
FIG. 6 is a view showing a displaying example of the screen in a case where the area of a layer 1 according to a related background art of the present invention is designated.
Figure 7:
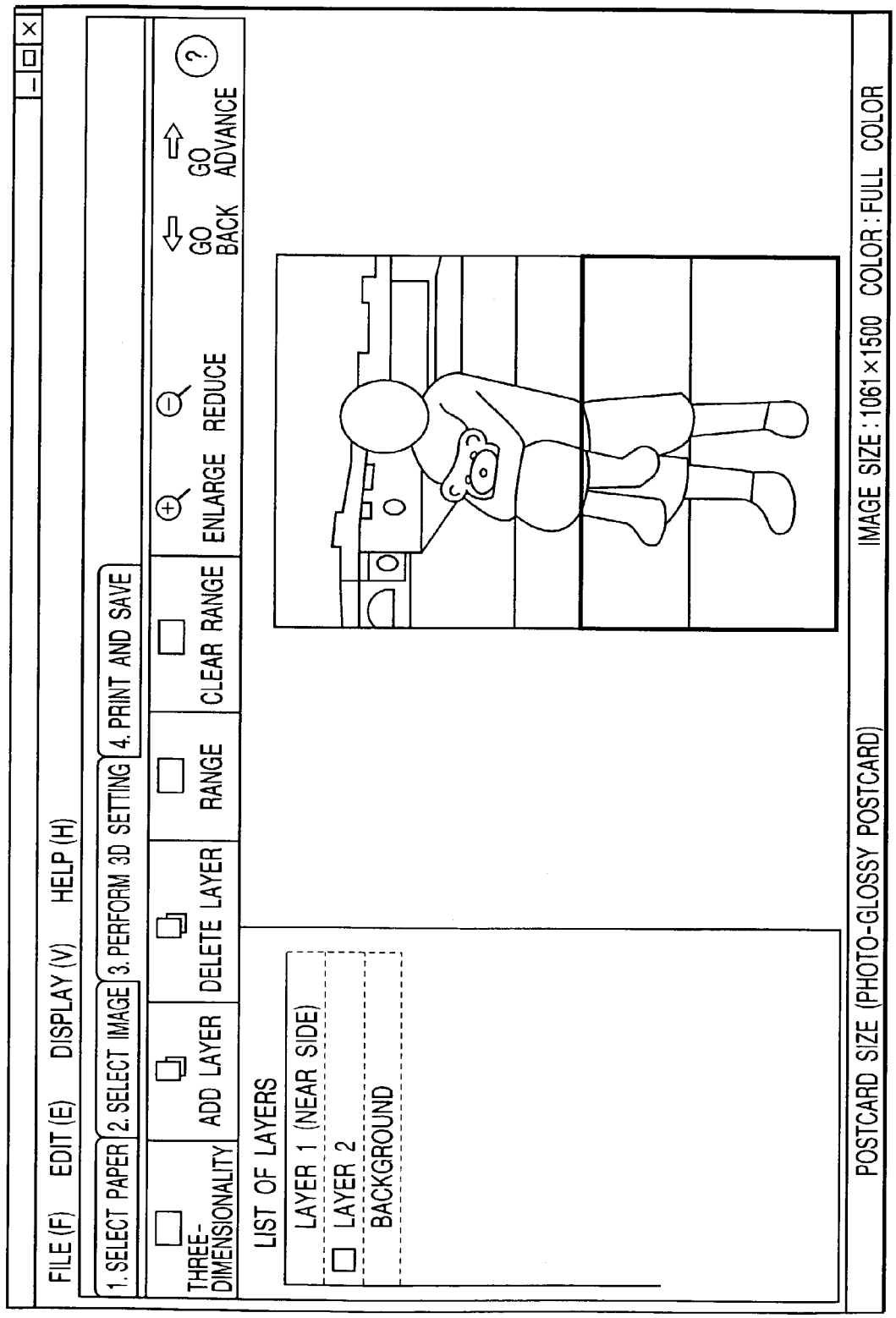
FIG. 7 is a view showing a displaying example of the screen in a case where the area of a layer 2 according to the related background art of the present invention is designated.

Moreover, as shown in FIG. 5, a certain image area which exists on the furthest layer in all the layers can be set as a background layer for which the user need not designate any closed area (i.e., for which it is impossible to set the closed area). Thus, in a case where the user edits a last layer (background layer), the areas on all the layers hitherto designated are displayed with shading as the OR-processed areas, whereby the user can confirm at one view the areas which have been designated on all the layers.

Next, in the step S27, the variable N in the program is incremented by one, and then it is judged in the step S28 whether or not a next layer exists. If it is judged that the next layer exists, the flow returns to the step S25 to judge whether or not to edit the next layer, and then the processes in the step S26 to S28 are repeated. On the other hand, if it is judged in the step S27 that the next layer does not exist, the process to setting the three-dimensional area ends, and the flow advances to the step S15 in FIG. 2.

As apparent from the above explanation, according to the present invention, in the case where the image area which is the target of editing (called editing-target image area) is designated, the image area which has been designated before the editing-target image area is designated is displayed in a display method different from that for the editing-target image area, whereby the user can confirm the already-designated area without changing the layer.

Moreover, according to the present invention, the image area which has been already designated as the target of editing is displayed in a display method different from that for the image area which cannot be designated by the image area designation means, whereby, e.g., at the end of the editing process, the user can confirm at one view the image areas which have been edited so far.

Second Embodiment

Next, the second embodiment of the present invention will be explained. The present embodiment achieves, in an application to cause a display apparatus to display or a print apparatus to print an image edited result, easy setting of a distance between layers by providing a means for changing the distance between the layers on image data composed of the plural layers. Hereinafter, the present embodiment will be explained with reference to the attached drawings.

Next, an image processing flow in an image processing apparatus according to the present embodiment will be explained in detail with reference to FIGS. 8 to 15.

Figure 8:
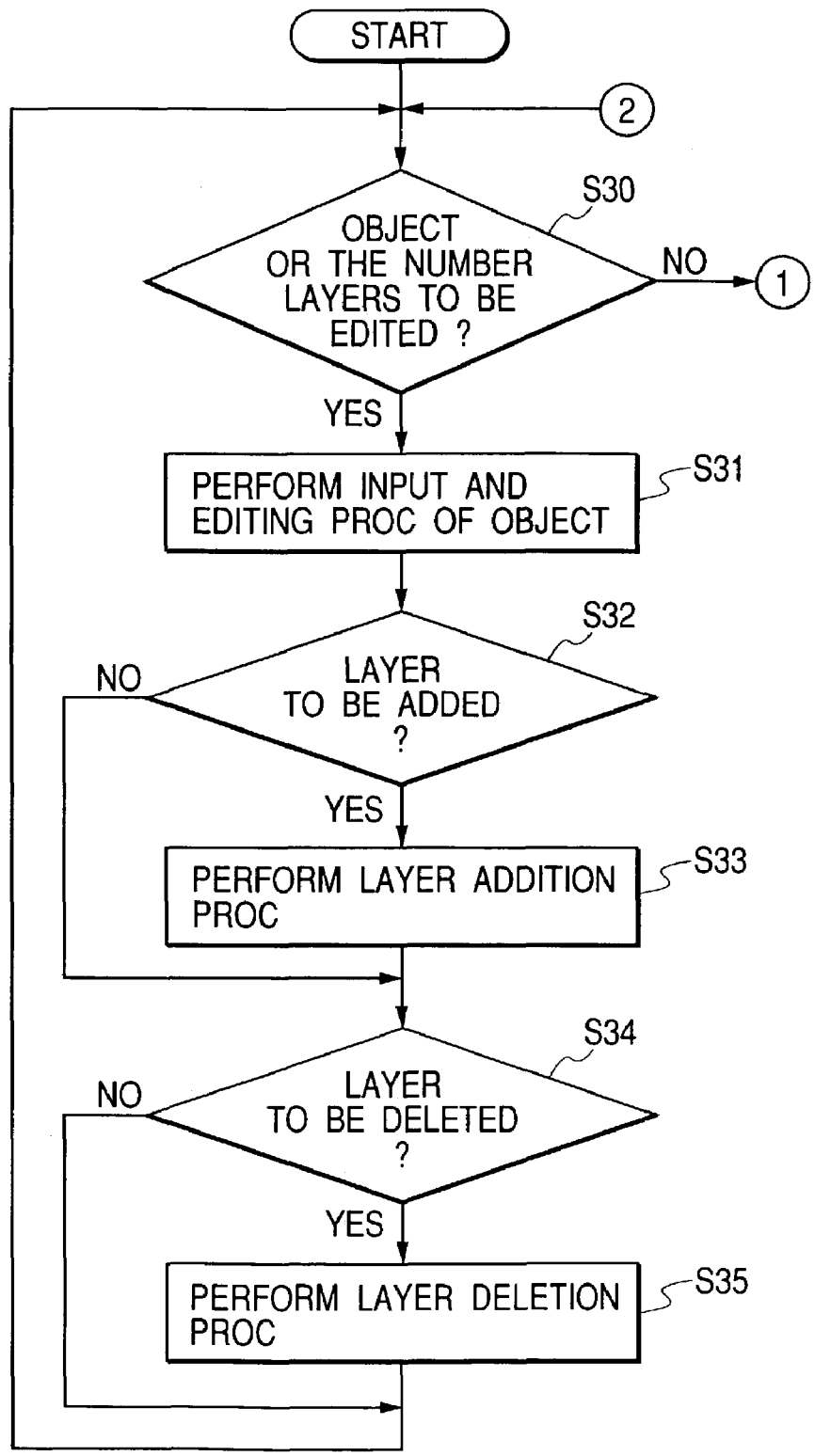
FIG. 8 is a flow chart showing a processing procedure according to other one (second) example of the present invention.
Figure 9:
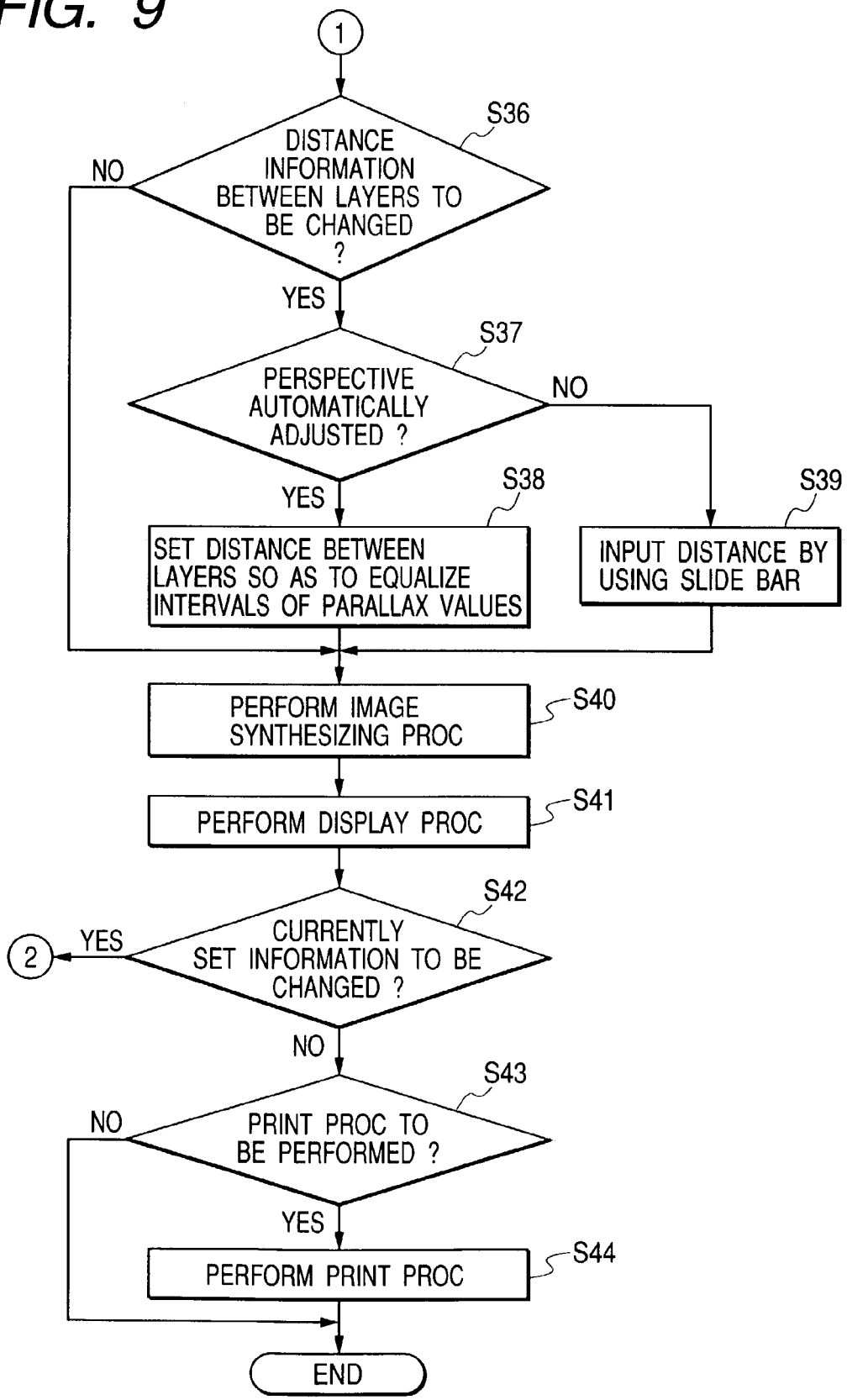
FIG. 9 is a flow chart showing the processing procedure according to the second embodiment of the present invention.

FIGS. 8 and 9 show a procedure that object information representing an object (or target) composed of the plural layers and distance information representing a distance between the layers are input and edited, and an image is displayed on a screen and printed on the basis of the edited result. Here, it should be noted that, in case of performing the process in the present embodiment, it is necessary to read beforehand image data representing a photograph or the like.

First, in a step S30, an input concerning whether to edit an object designating an arbitrary area in the image data representing the photograph or the like or to edit the number of layers is received. If the input to edit the object or the number of layers is received in the step S30, the flow advances to a step S31 to input and edit the object.

Figure 10:
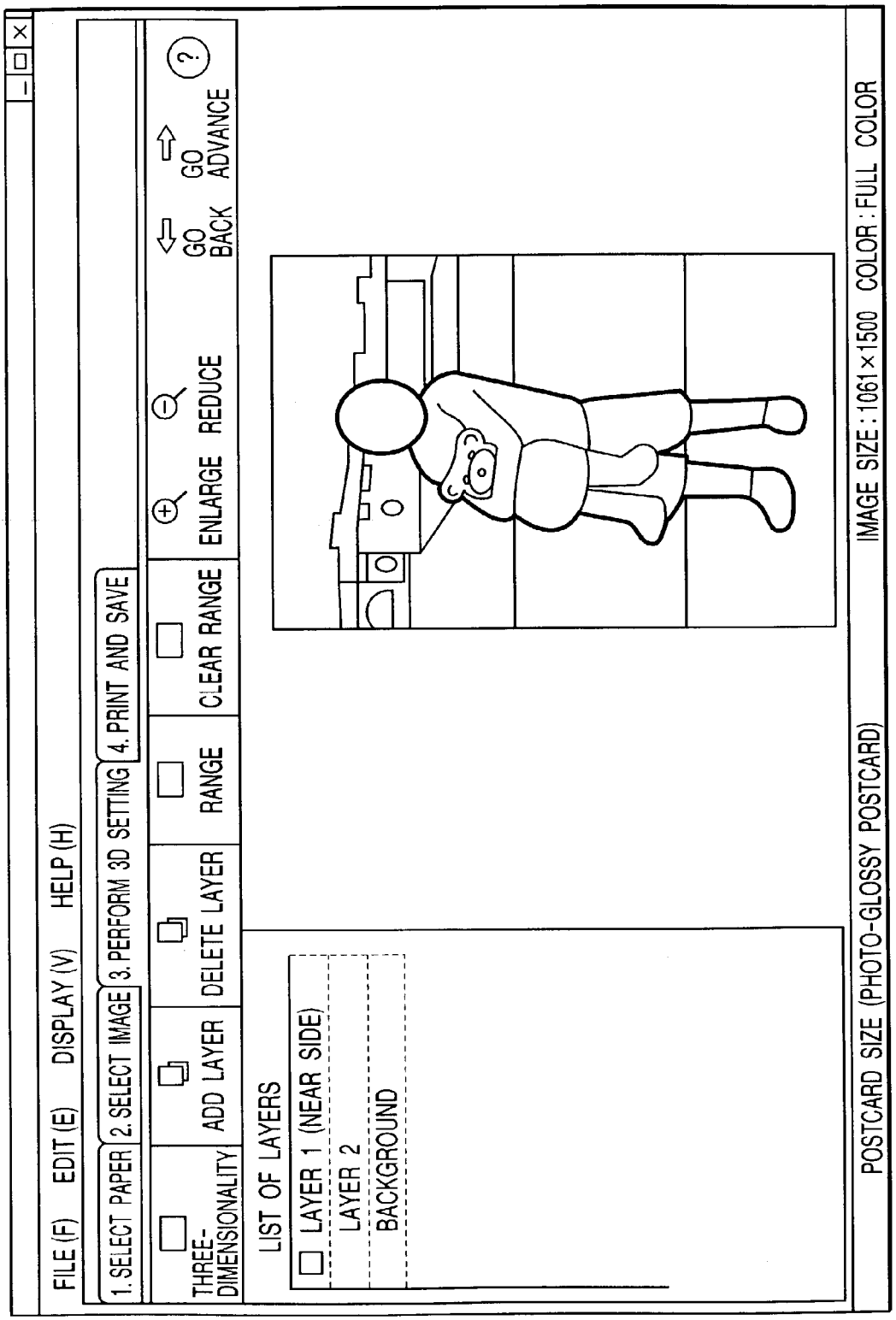
FIG. 10 is a view showing a displaying example of the screen in a case where the area of a layer 1 according to the second embodiment of the present invention is designated.
Figure 11:
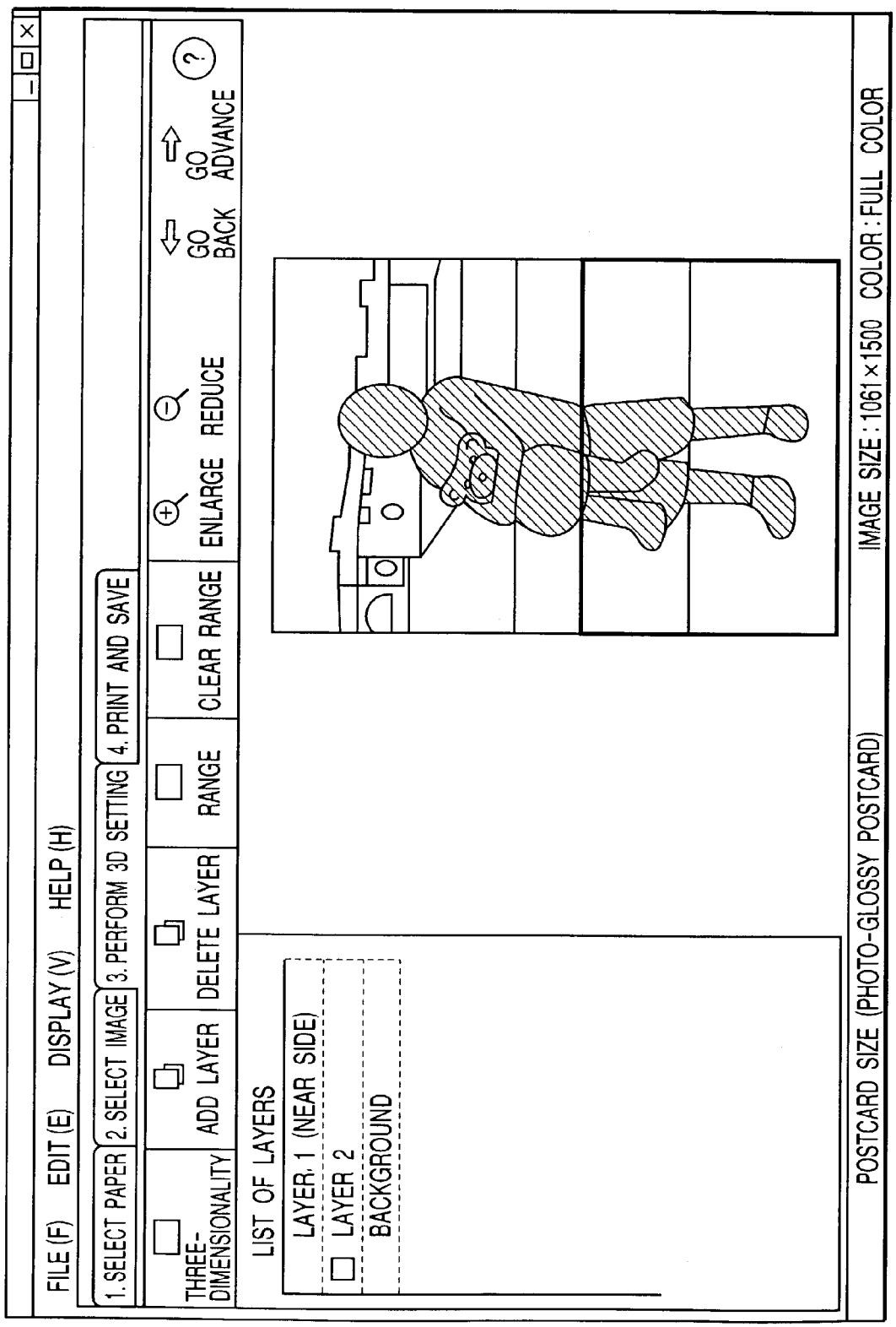
FIG. 11 is a view showing a displaying example of the screen in a case where the area of a layer 2 according to the second embodiment of the present invention is designated.
Figure 12:
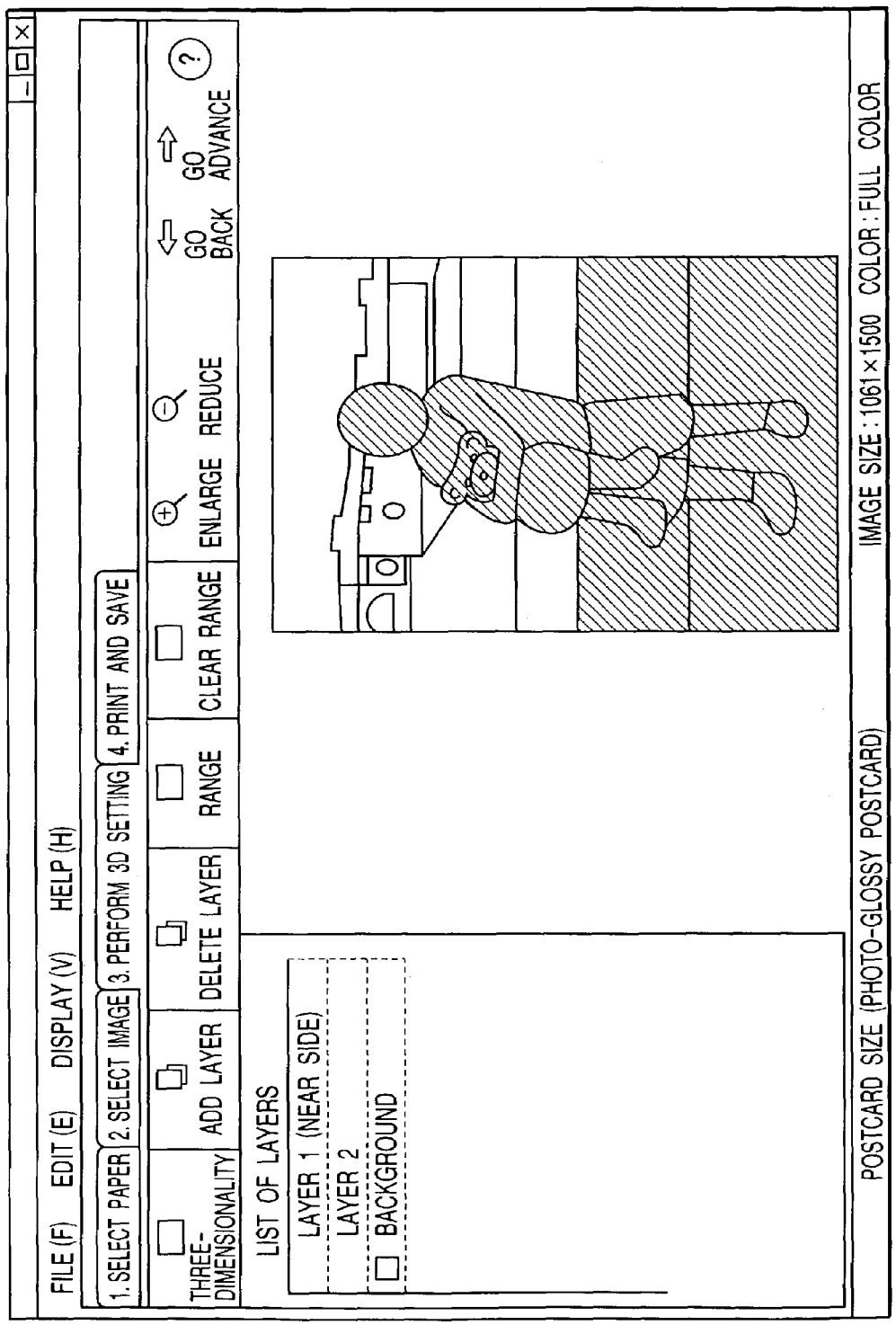
FIG. 12 is a view showing a displaying example of the screen of a background layer according to the second embodiment of the present invention is designated.
Figure 13:
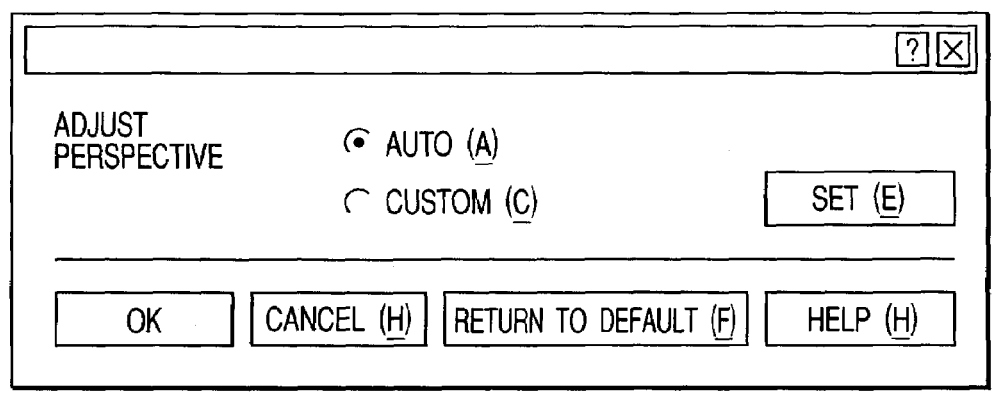
FIG. 13 is a view showing a displaying example of the screen which is used in adjustment of perspective according to the second embodiment of the present invention.

FIGS. 10 to 12 show the states that the object to designate the area is set in the step S31. More specifically, FIG. 10 shows the state that the range of a most-foreground (this-side) layer (layer 1) is designated, FIG. 11 shows the state that the range of a layer (layer 2) behind the layer 1 is designated, and FIG. 12 shows which portion the innermost or far-side (background) range corresponds to. In regard to the layer 2 and the background, the area selected on the beforehand layer is displayed with shading to define the range selected on the foreground layer. Here, it should be noted that the innermost (background) range is not obtained by selecting the area, that is, the innermost range is obtained by the areas not selected on the foreground layer. Moreover, it should be noted that the above range is selected as a closed area by using an input device such as a mouse pointer or the like with respect to each layer.

Then, in a step S32, an input concerning whether or not to add a layer is received to generate the image data composed of the plural layers from the image data representing the photograph or the like. If the input to add the layer is received in the step S32, the flow advances to a step S33 to perform a layer addition process. Then, in a step S34, an input concerning whether or not to delete the existing layer is received. If the input to delete the layer is received in the step S34, the flow advances to a step S35 to perform a layer deletion process.

On the other hand, if the input to edit the object or the number of layers is not received in the step S30, the flow advances to a step S36 to receive an input concerning whether or not to change the distance information between the layers. If the input to change the distance information between the layers is received in the step S36, a process to change the distance information between the layers is performed. That is, it is first judged in a step S37 whether or not to automatically adjust perspective. FIG. 12 shows the screen on which the input concerning the automatic adjustment of the perspective is received. Here, it should be noted that this screen is displayed when a "THREE-DIMENSIONALITY" button on the screens shown in FIGS. 10 to 12 is depressed. In any case, if it is judged in the step S37 to automatically adjust the perspective, then the distance between the layers is determined so that a parallax value between the layers is equalized with others. On the other hand, if it is judged in the step S37 not to automatically adjust the perspective, the flow advances to a step S39 to display the screen for setting the distance between the layers. Thus, the distance of each layer is set on this screen.

Here, a process to generate a three-dimensional (or stereoscopic) image from a plane image will be explained. In the present embodiment, the three-dimensional image is obtained by using a lenticular lens. Thus, as shown in FIGS. 10 to 12, a parallax map which represents a depth distribution of the subject based on the area information selected on each layer and the distance information between the layers is formed, a multiviewpoint image is generated based on the parallax map and the plane image, and then a three-dimensional-striped image is generated as shown in FIG. 15.

Figure 14:
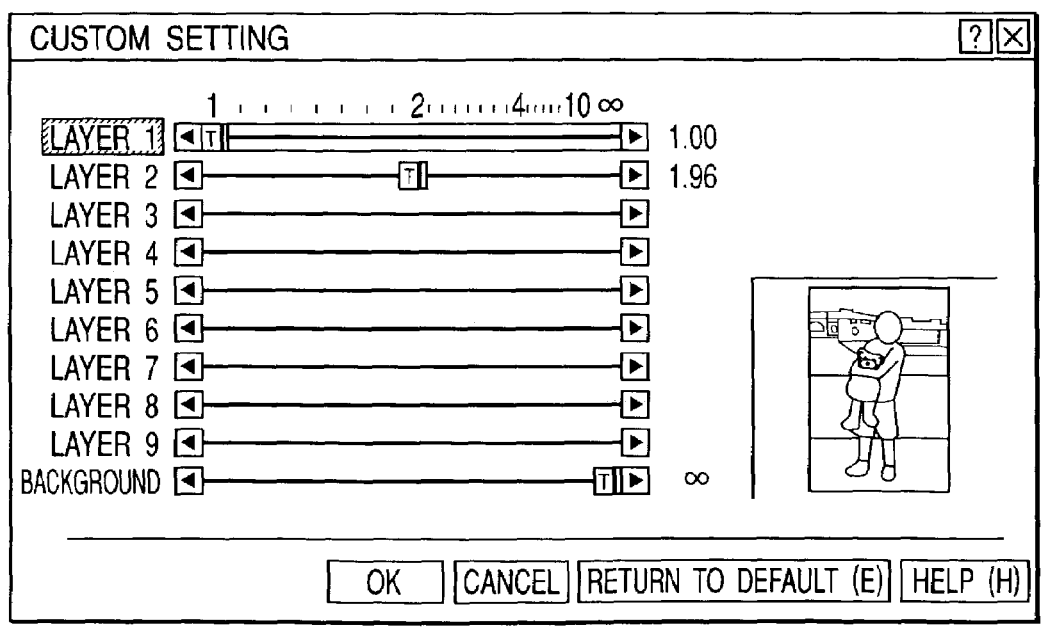
FIG. 14 is a view showing a displaying example of a screen which is used to arbitrarily set, by using a slide bar, a distance between the layers according to the second embodiment of the present invention.

The distance information between the layers is set by performing setting from the layer 1 to the background with use of the values from 0 to 255 (parallax values). At this time, in a case where automatic setting of the distance information is selected on the screen shown in FIG. 13, the distance information is set so that the parallax values (represented by 256 levels) between the layers become the same value. On one hand, in a case where custom setting of the distance information is selected on the screen shown in FIG. 13, the distance information of each layer can be freely set. For this reason, a setting button on the screen shown in FIG. 13 becomes available, and a custom setting screen as shown in FIG. 14 is displayed if the setting button is depressed. On the screen shown in FIG. 14, the layer of which the distance is to be changed is selected by selecting its layer name or its slide bar. Here, the area information corresponding to the selected layer is displayed on the screen (i.e., the right-side portion of FIG. 14) so that the user can easily discriminate the area information of each layer.

Then, the distance of each layer is set by using the knob on the slide bar and the buttons at both the ends of the slide bar. In the present embodiment, the layer 1 is the most-foreground layer (i.e., this-side layer) and the background is the innermost layer (i.e., far-side layer). In such a case, if the user intends to make the position of the slide bar of the this-side layer rightward over the position of the slide bar of the far-side layer, he moves the slide bar of the this-side layer rightward from the point of time when the position of the this-side layer reaches the position of the far-side layer, whereby the slide bar of the far-side layer moves to the same position as that of the this-side layer. Moreover, if the user intends to make the position of the slide bar of the far-side layer leftward over the position of the slide bar of the this-side layer, he moves the slide bar of the far-side layer leftward from the point of time when the position of the far-side layer reaches the position of the this-side layer, whereby the slide bar of the this-side layer moves to the same position as that of the far-side layer.

Incidentally, since the knob on the slide bar has the 256 positions corresponding to the 256 values used in the parallax map, the value corresponding to the distance in the actual space where the subject is shot is displayed on the right side of the slide bar so that the user can easily grasp the actual distance. Here, the parallax (p) and the distance (Z) satisfy the following equation.

$$Z=255/(255-p)$$

Since the parallax (p) is $0 \leq p \leq 255$, the distance (Z) has the values from 1 to $\infty$. In any case, as a unit of numerical value, it is possible to use a centimeter or a meter according to the space where the subject is shot.

After then, if a "GO ADVANCE" button is depressed or a "PRINT AND SAVE" tab is selected on the screen shown in FIG. 11, an image synthesizing process is performed in a step S40 so as to generate the three-dimensional image data from the image data representing a photograph or the like, the object information designating the arbitrary area in the image data, and the distance information between the layers. Then, in a step S41, the result of the image synthesizing process is displayed on the screen shown in FIG. 17.

Next, in a step S42, an input concerning whether or not to change the currently set information is received. If the input to change the currently set information is received, the flow returns to the step S30 to again perform the processes in the step S30 and the following steps. At this time, if the layer is added, the distance between the layers is determined as follows in accordance with the setting of the perspective adjustment.

Figure 17:
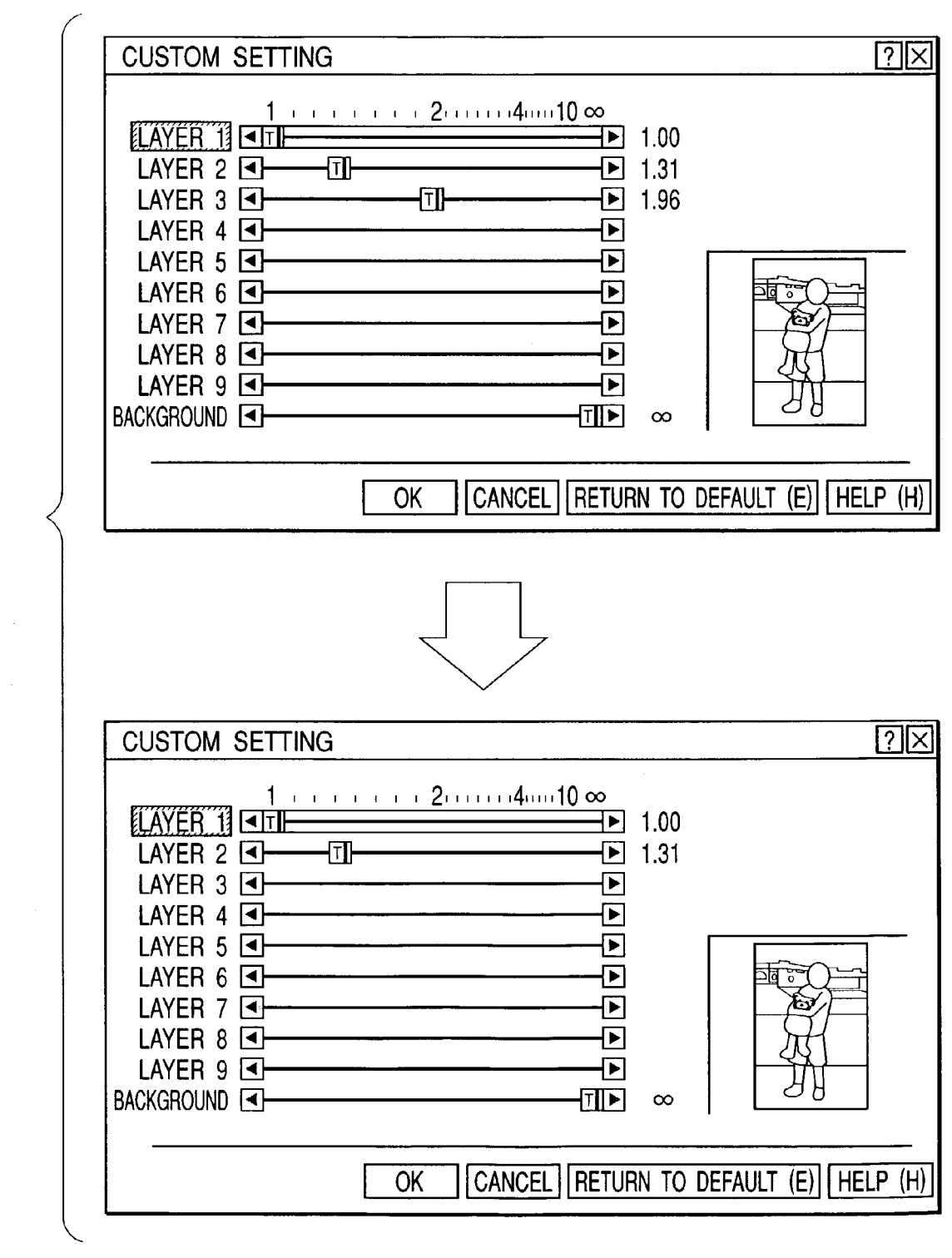

That is, in the case where the automatic adjustment of the distance between the layers is selected, if an "ADD LAYER" button or a "DELETE LAYER" button is depressed on the screens shown in FIGS. 10 to 12 to add or delete the layer, the distances of the layers are recalculated in the step S38 so that all the parallax values between the layers become the same value in consideration of the added or deleted layers. In the case where the custom adjustment of the distance between the layers is selected, if the "ADD LAYER" button is depressed to add the layer, as shown in FIG. 16, the distance of the added layer is determined so that the distance between the new layer and the layer positioned in this side by one is equalized with the distance between the new layer and the layer positioned behind the new layer by one. Here, it should be noted that the distances between the layers other than the newly added layer are not changed from the previously set contents. Furthermore, in the case where the custom adjustment of the distance between the layers is selected, if the "DELETE LAYER" button is depressed to delete the layer, as shown in FIG. 17, the distances between the layers other than the deleted layer are not changed from the previously set contents.

Figure 18:
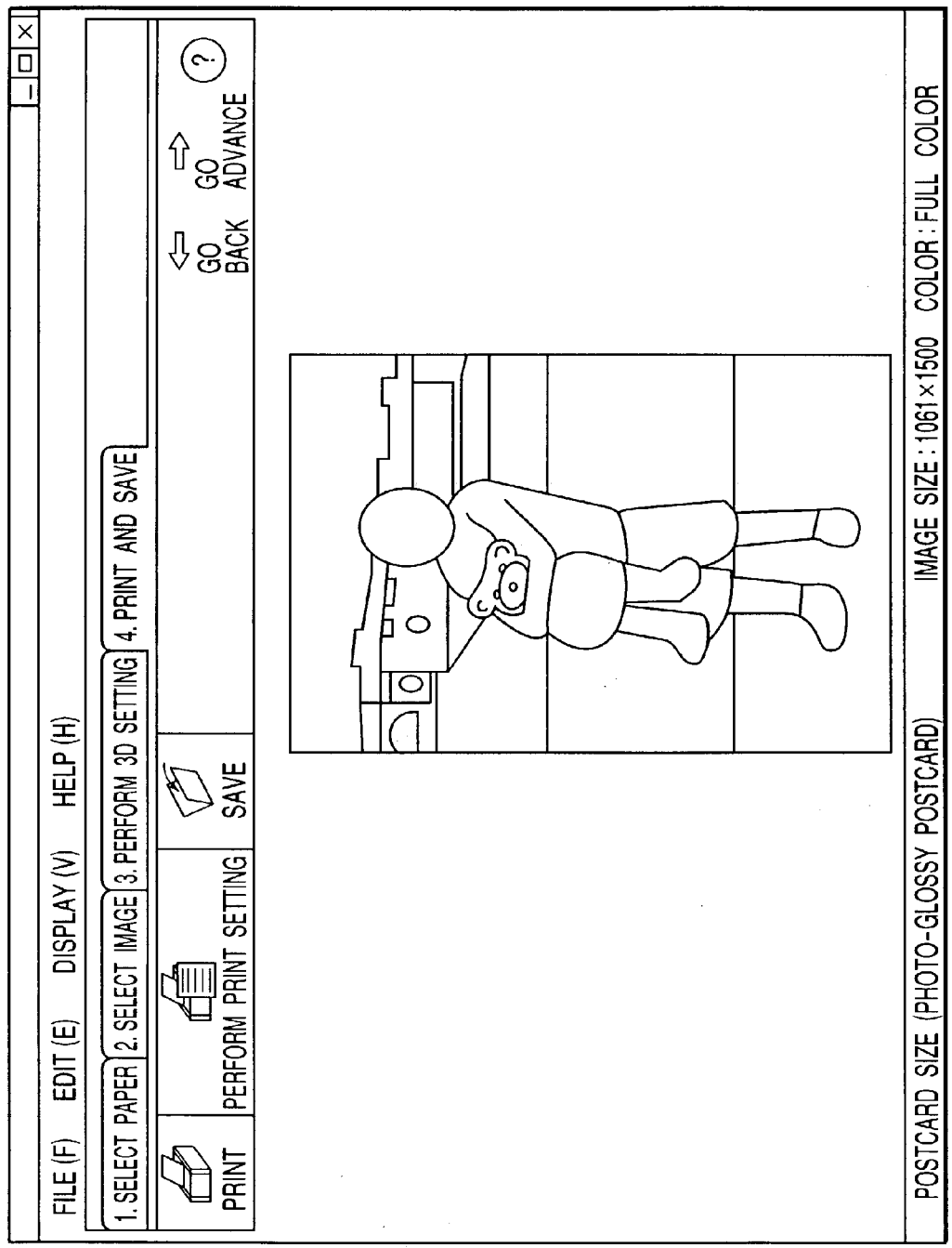
FIG. 18 is a view showing a print processing screen according to the second embodiment of the present invention.

Incidentally, if the input not to change the currently set information is received in the step S42, the flow advances to a step S43 to receive an input concerning whether or not to perform a print process. If the input to perform the print process is received through a "PRINT" button on the screen shown in FIG. 18, the image data which is three-dimensionally viewed is generated by using the lenticular lens and then the print process is performed to the generated image data in a step S44.

As explained above, according to the present embodiment, the means which changes the distance between the layers without changing the area information on the layer in consideration of the distance between the layers is provided, whereby it is possible to easily change the setting of the distance between the layers.

Moreover, according to the present embodiment, in regard to the image data composed of the plural layers, it is possible to easily determine the distances between the layers even in case of adding and deleting the layer.

Moreover, in regard to how to determine the distance between the layers in case of adding and deleting the layer, there are provided the two kinds of modes, i.e., the automatic mode and the custom mode, whereby it is possible to simply and easily set and adjust the distance between the layers according to the user's intention.

Other Embodiments

In the above embodiments of the present invention, a case where an ink-jet system has been adopted as the print system of the print apparatus is explained by way of example. However, the present invention is not limited to the ink-jet print system, but is applicable to various print systems such as an electrophotographic print system, a thermal transfer print system, a thermal print system, an electrostatic print system and the like. Incidentally, the present invention is applicable to a system consisting of plural devices (e.g., a host computer, an interface equipment, a reader, a printer and the like), or to an apparatus comprising a single device (e.g., a copy machine, a facsimile apparatus or the like).

Furthermore, it is needless to say that the present invention can be achieved even in a case where a storage medium (or a recording medium) storing therein program codes of software to realize the functions of the above embodiments is supplied to a system or an apparatus, and thus a computer (or CPU, MPU) in the system or the apparatus reads and executes the program codes stored in the storage medium.

In this case, the program codes themselves read from the storage medium realize the functions of the above embodiments, whereby the storage medium storing these program codes constitutes the present invention. As the storage medium from which the program codes are supplied, e.g., a floppy™ disk, a hard disk, an optical disk, a magnetooptical disk, a CD-ROM, a CD-R, a magnetic tape, a non-volatile memory card, a ROM and the like can be used.

Furthermore, it is needless to say that the present invention includes not only a case where the functions of the above embodiments are realized by executing the program codes read by the computer, but also a case where an OS (operating system) or the like running on the computer performs a part or all of the actual processes on the basis of instructions of the program codes and thus the functions of the above embodiments are realized by such processes.

Furthermore, it is needless to say that the present invention also includes a case where, after the program codes read from the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiments are realized by such processes.

In a case where the present invention is applied to the above storage medium, the program codes corresponding to the flow charts shown in FIGS. 2, 3, 7 and 8 of the above embodiments are stored in this medium.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing apparatus comprising:
object setting means for setting, on image data composed of plural layers, object information being a target of editing with respect to each layer;
distance setting means for setting distance information representing a distance between the layers;
generation means for generating three-dimensional image data from the image data on the basis of the distance information set by said distance setting means and the object information set by said object setting means; and
addition means for adding a new layer on the image data,
wherein said distance setting means equally sets the distance between the new layer and the layer positioned in this side by one and the distance between the new layer and the layer positioned behind the new layer by one, and does not change the distances between other layers respectively from already set contents.

2. An image processing apparatus comprising:
object setting means for setting, on image data composed of plural layers, object information being a target of editing with respect to each layer;
distance setting means for setting distance information representing a distance between the layers;
generation means for generating three-dimensional image data from the image data on the basis of the distance information set by said distance setting means and the object information set by said object setting means; and
deletion means for deleting the existing layer on the image data,
wherein said distance setting means does not change the distances between the layers other than the layer deleted by said deletion means respectively from already set contents.

3. An image processing apparatus comprising:
object setting means for setting, on image data composed of plural layers, object information being a target of editing with respect to each layer;
distance setting means for setting distance information representing a distance between the layers;
generation means for generating three-dimensional image data from the image data on the basis of the distance information set by said distance setting means and the object information set by said object setting means; and
layer number change means for adding a new layer or deleting the existing layer on the image data,
wherein said distance setting means equally sets the distances between all the layers including the new layer or the deleted layer.

4. An image processing method comprising:
a step of causing an object setting means to set, on image data composed of plural layers, object information being a target of editing with respect to each layer;
a step of causing a distance setting means to set distance information representing a distance between the layers;
a step of causing a generation means to generate three-dimensional image data from the image data on the basis of the distance information set by the distance setting means and the object information set by the object setting means; and
a step of causing an addition means to add a new layer on the image data,
wherein said distance setting means equally sets the distance between the new layer and the layer positioned in this side by one and the distance between the new layer and the layer positioned behind the new layer by one, and does not change the distances between other layers respectively from already set contents.

5. A computer-readable recording medium on which a program to cause a computer to execute an image processing method is recorded, said method comprising:
a step of causing an object setting means to set, on image data composed of plural layers, object information being a target of editing with respect to each layer;
a step of causing a distance setting means to set distance information representing a distance between the layers; and a step of causing a generation means to generate three-dimensional image data from the image data on the basis of the distance information set by the distance setting means and the object information set by the object setting means; and a step of causing an addition means to add a new layer on the image data, wherein said distance setting means equally sets the distance between the new layer and the layer positioned in this side by one and the distance between the new layer and the layer positioned behind the new layer by one, and does not change the distances between other layers respectively from already set contents.

6. A computer-readable recording medium on which a program to cause a computer to execute a computer processing method is recorded, said method comprising:

a step of causing an object setting means to set, on image data composed of plural layers, object information being a target of editing with respect to each layer;

a step for causing a distance setting means to set distance information representing a distance between the layers;

a step for causing a generation means to generate three-dimensional image data from the image data on the basis of the distance information set by the distance setting means and the object information set by the object setting means; and a step for causing deletion means to delete the existing layer on the image data, wherein the distance setting means does not change the distances between the layers other than the layer deleted by the deletion means respectively from already set contents.

7. A computer-readable recording medium on which a program to cause a computer to execute a computer processing method is recorded, said method comprising:

a step of causing object setting means to set, on image data composed of plural layers, object information being a target of editing with respect to each layer;

a step for causing distance setting means to set distance information representing a distance between the layers;

a step for causing generation means to generate three-dimensional image data from the image data on the basis of the distance information set by the distance setting means and the object information set by the object setting means; and a step of causing layer number change means to add a new layer or delete the existing layer on the image data, wherein the distance setting means equally sets the distances between all the layers including the new layer or the deleted layer.

* * * * *

UNITED STATES PATENT AND TRADEMARK OFFICE
CERTIFICATE OF CORRECTION

| | | |
|---|---|---|
| PATENT NO. | : 7,365,875 B2 | Page 1 of 1 |
| APPLICATION NO. | : 10/430220 | |
| DATED | : April 29, 2008 | |
| INVENTOR(S) | : Yasushi Mochizuki et al. | |

It is certified that error appears in the above-identified patent and that said Letters Patent is hereby corrected as shown below:

ON COVER PAGE [56] REFERENCES CITED:

Foreign Patent Documents, "08227464" should read --08-227464--.

ON COVER PAGE [57] ABSTRACT:

Line 1, "It" should read --A display method--.

COLUMN 1:

Line 44, "layer" should read --layers--.

COLUMN 5:

Line 18, "not" should read --none--.

COLUMN 11:

Line 56, "expect" should read --except--.

COLUMN 12:

Line 67, "and" should be deleted.

Signed and Sealed this

Fourth Day of November, 2008

JON W. DUDAS
*Director of the United States Patent and Trademark Office*